United States Patent [19]

Junck et al.

[11] 3,995,532

[45] Dec. 7, 1976

[54] PROPORTIONAL CONTROL VALVE WITH PRECONDITIONED INLET MODULATING RELIEF VALVE

[75] Inventors: John A. Junck, Joliet; Larry W. Lorimor, Crest Hill, both of Ill.

[73] Assignee: Caterpillar Tractor Co., Peoria, Ill.

[22] Filed: July 15, 1974

[21] Appl. No.: 488,748

[52] U.S. Cl. .................... 91/411 R; 91/451

[51] Int. Cl.[2] .................... F16K 11/00

[58] Field of Search .................... 91/411 R, 451, 468; 137/596.12, 596.13, 115, 116

[56] References Cited

UNITED STATES PATENTS

| | | | |
|---|---|---|---|
| 3,260,325 | 7/1966 | Brown et al. | 91/420 X |
| 3,416,561 | 12/1968 | Kokaly | 91/451 X |
| 3,455,210 | 7/1969 | Allen | 137/596.13 X |
| 3,693,506 | 9/1972 | McMillen et al. | 91/412 |
| 3,771,564 | 11/1973 | Bianchetta et al. | 137/596.13 X |
| 3,847,180 | 11/1974 | Kroth et al. | 91/451 X |

*Primary Examiner*—Carlton R. Croyle
*Assistant Examiner*—Edward Look
*Attorney, Agent, or Firm*—Phillips, Moore, Weissenberger, Lempio & Strabala

[57] ABSTRACT

A fluid control circuit for regulating flow from a source of fluid under pressure to a hydraulic motor, including a control valve having a movable spool for communicating fluid entering an inlet chamber from the source with service chambers in communication with the motor, an inlet relief valve selectively pressurizing the inlet chamber in response to spring means and signal fluid received from the service chambers through signal passages. The control valve and its spool are configured to insure that the signal passages are always in positive communication either with one of the service chambers or a drain in order to facilitate manipulation of the spool. The control valve is also adapted to communicate signal fluid to the relief valve prior to communication of either service chamber with the inlet chamber in order to precondition the relief valve and improve response of the motor to manipulation of the control valve.

13 Claims, 4 Drawing Figures

PROPORTIONAL CONTROL VALVE WITH PRECONDITIONED INLET MODULATING RELIEF VALVE

BACKGROUND OF THE INVENTION

The present invention relates to a fluid control circuit for regulating communication between a source of fluid under pressure and a hydraulic motor. More particularly, the invention relates to such a circuit adapted for regulating high pressure fluid flow as is commonly required in the operation of various machines such as earthmoving equipment. The invention especially contemplates improved operation of a control valve within the circuit and improved response of the motor to manipulation of the control valve.

In hydraulic circuits of the type noted above, the source is in communication with an Inlet of the control valve with a relief valve being employed to provide load responsive operating fluid flow and pressure when the control valve is conditioned to communicate fluid from its inlet to the hydraulic motor. Otherwise, fluid entering the inlet chamber from the source is returned to a drain with only minimum resistance provided by a spring within the relief valve. Such an inlet relief valve is conditioned to commence pressure modulation by fluid signals communicated to the spring chamber end of the relief valve from the control valve.

Load-compensating, flow control valves of this type are employed because the source or pump need not operate against a substantial resistance when fluid pressure is not being communicated to the motor. Also, since the modulated pressure established by the inlet relief valve is a function of load pressure and the pressure rating of its biasing spring rather than an arbitrarily fixed pressure, the control valve spool experiences reduced flow forces which tend to facilitate its manipulation. Such a control circuit is described, for example, in U.S. patent application, Ser. No. 211,333, filed Dec. 23, 1971 and assigned to the assignee of the present invention, now U.S. Pat. No. 3,847,180, issued Nov. 12, 1974. Additional prior art references relating to load compensating, flow control circuits include U.S. Pat. Nos. 3,260,325; 3,566,749; and 3,693,506, all of which are assigned to the assignee of the present invention. Additional prior art references include U.S. Pat. Nos. 2,941,547 and 3,718,159.

Within the prior art control circuits, it is common to design the main control valve with close manufacturing tolerances so that various passages within the control circuit open and close at desirably the same instant. Further, the inlet relief valve is commonly responsive to a fluid signal or signals also communicated from the control valve at the same time.

Such design criteria, relating to "timing" of the valve components within the control circuit may in turn lead to problems where various passages of the control circuit are undesirably blocked or, on the other hand, where the passages may experience undesirable cross-flow or leakage resulting in the dropping of a load. Generally, it appears that undesirable cross-flow has been considered more of a problem within such control circuits. Accordingly, the control valves have commonly been designed with a "dead band" where the passages leading to the inlet relief valve, for example, are neither in positive communication with a pressurized passage nor with a fluid drain as the control valve is being moved from a neutral position into a position for operating the motor. Such a condition produces a lack of positive control of the inlet chamber pressure.

Furthermore, pressure within the inlet chamber tends to be modulated toward a desired operating pressure commencing at the same instant that the inlet chamber enters into communication with a service chamber. Accordingly, at the instant when one of the service chambers is placed in communication with the inlet chamber, it is possible that fluid pressure within the inlet chamber may not exceed that in the service chamber so that fluid flow to the service chamber from the inlet passage may experience a slight but nevertheless undesirable delay.

SUMMARY OF THE INVENTION

Accordingly, it is an object of the present invention to provide a pressure-compensating, hydraulic control circuit for overcoming one or more problems of the type described above.

It is a more particular object of the present invention to provide a pressure-compensating, flow-controlled hydraulic circuit including a control valve for regulating operation of a hydraulic motor and an inlet relief valve responsive to a fluid signal from the control valve for modulating inlet pressure when the control valve is conditioned to operate the hydraulic motor, the control valve including means for signalling the inlet relief valve to commence pressure modulation within the inlet chamber prior to communication of the inlet chamber with a service chamber and the motor.

It is a further object of the invention to provide a pressure compensating flow control hydraulic circuit of the type referred to in the preceding paragraph wherein the hydraulic motor is of the double-acting type and the control valve includes a pair of service chambers providing communication with different portions of the motor, the control valve being configured to communicate the other service chamber with drain at substantially the same time that the inlet relief valve is signalled to commence modulation of the inlet pressure.

It is another particular object of the present invention to provide a pressure-compensating, flow-controlled hydraulic circuit including a control valve for regulating operation of a hydraulic motor and an inlet relief valve responsive to manipulation of the control valve, the control valve including means for positively communicating the inlet relief valve with either a drain or a service chamber at all times.

It is still another object of the present invention to provide a control valve for use in pressure-compensating, flow-controlled hydraulic circuit also having an inlet relief valve, the control valve including a spool slidably arranged within a bore to regulate fluid communication thereacross, the spool and/or the bore being novelly configured to accomplish one or more of the objects referred to above.

Additional objects and advantages of the invention will be made apparent in the following description having reference to the accompanying drawings.

DESCRIPTION OF THE PREFERRED EMBODIMENT

Figure 1:
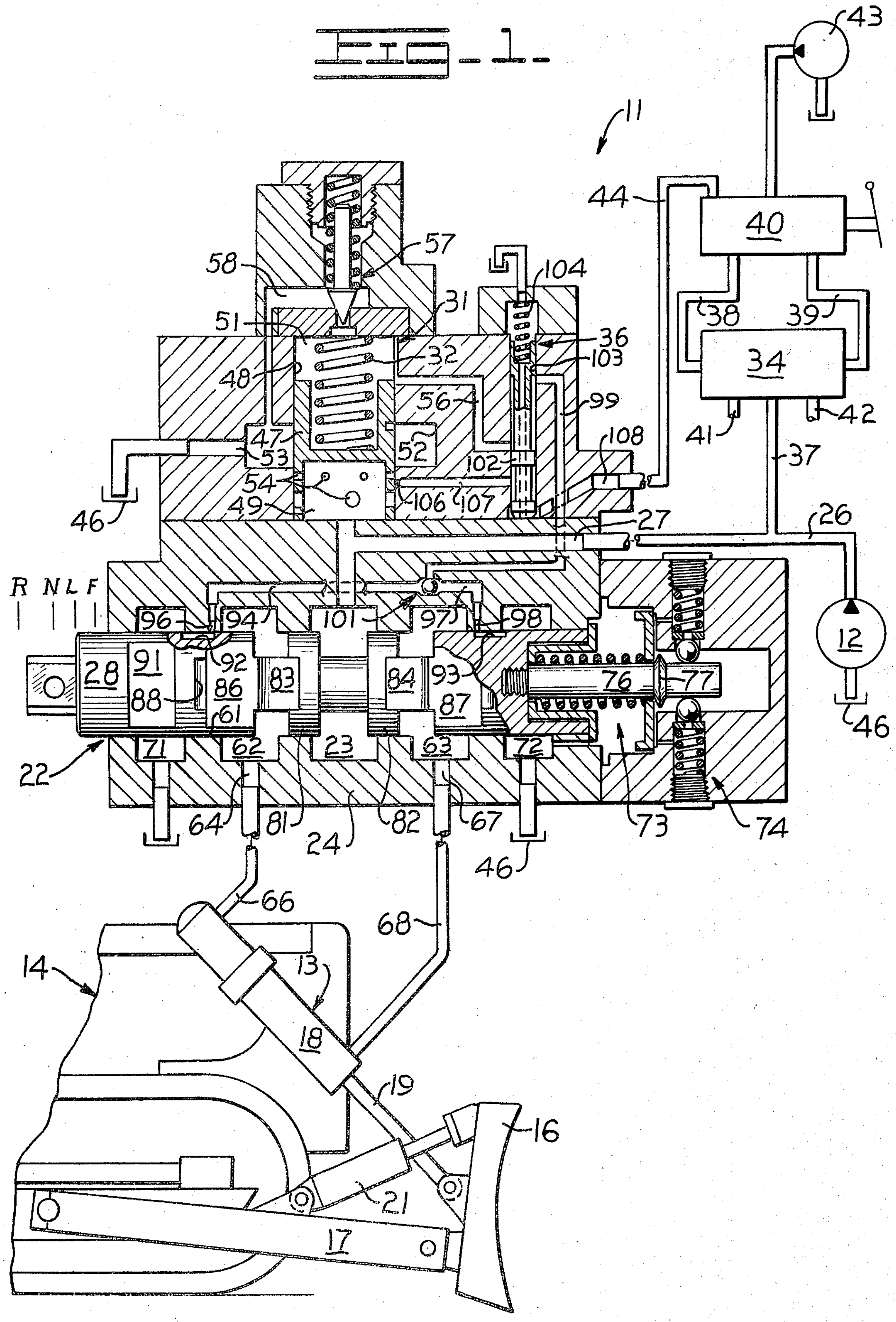
FIG. 1 is a generally schematic representation, with parts in section, of a pressure-compensating, flow-controlled hydraulic circuit constructed according to the present invention for regulating fluid communication to a hydraulic motor which preferably comprises a portion of an earth moving machine.

A control circuit constructed according to the present invention is indicated at 11 in FIG. 1 for regulating fluid flow from a pump or source of fluid under pressure 12 to a hydraulic motor indicated at 13. The motor 13 is preferably embodied as a double-acting jack for operating a component or implement of an earth moving machine 14.

The earth moving machine 14 is preferably a tractor having a bulldozer blade 16 movably mounted at one end thereof by push arms, one of which is indicated at 17. The jack 13 includes a cylinder 18 having an extensible rod 19, the cylinder and rod being pivotably interconnected between the tractor and blade so that operation of the jack 13 serves to raise and lower the blade. Additional motors or jacks, such as that indicated at 21, may be pivotably interconnected between the blade and the push arm 17, for example, to conventionally regulate pitching and/or tilting of the blade 16 relative to the tractor 14.

Although the preferred embodiment of the invention, as illustrated in FIG. 1, is described for operating a double-acting jack employed to adjust an implement or component of the vehicle 14, it will be apparent from the following description that the control circuit of the present invention may also be employed for regulating other hydraulic motors, such as single-acting jacks for example, employed in a variety of applications.

The control circuit 11 includes a control valve 22 having a valve body 24 forming an inlet chamber 23 in communication with the pump 12 by means of a conduit 26 and an internal passage 27 within the valve body. A spool 28 is slidably arranged within the valve 22 and operable by conventional means (not shown) to selectively communicate fluid entering the inlet chamber from the pump 12 with opposite ends of the jack 13 in a manner described in greater detail below.

A hydraulically responsive relief valve or dump valve 31 is responsive to spring means indicated at 32 and also to a fluid signal in a manner described below for modulating fluid pressure in the inlet chamber 23 when the spool 28 is moved from its neutral position illustrated in FIG. 1 to operate the jack 13. When the spool 28 is in its neutral position, fluid pressure to which the relief valve 31 is responsive is communicated to drain so that fluid pressure within the inlet chamber 23 is then modulated by the relief valve 31 in response to the spring 32 acting substantially alone.

As noted above, the control circuit 11 is preferably adapted for use in applications requiring substantially high operating fluid pressures, for example, on the order of 2,500 psi in order to operate a motor such as the jack indicated at 13. Due to the present combination of the control valve 22 and relief valve 31, fluid pressure in the inlet chamber 23 may be modulated to a relatively minimum pressure, for example, 80 psi, when the spool 28 is in its neutral or hold position. Accordingly, the pump 12, which operates against this minimum pressure, consumes minimum power and there is relatively little heat generation within the circuit 11 while fluid is being vented from the inlet chamber 23.

The control circuit 11 is also adapted for operation of an additional motor (not shown), for example, a jack regulating an implement such as a ripper, by means of a second control valve 34 in the circuit 11. A by-pass valve 36 is in responsive communication with a pilot control valve 40 and in communication with the relief valve 31. Operating fluid pressure is received by the second control valve 34 through a conduit 37 which is in communication with the inlet chamber 23. Accordingly, the relief valve 31 may be conditioned by the by-pass valve 36 in response to operation of the pilot control valve 40 to modulate fluid pressure in the inlet chamber 23 and passage 27 which is communicated to the second control valve 34 through the conduit 37. The second control valve 34 is preferably pilot operated by pilot fluid pressure received through respective conduits 38 and 39 from the manually operated pilot control valve 40 to selectively communicate fluid pressure through service conduits 41 and 42 to a motor or jack operated thereby. Fluid under pressure is communicated to the pilot control valve 40 from a pump 43. The pilot control valve 40 is in communication with the by-pass valve 36 through a conduit 44 to provide for response of the by-pass valve as described below.

The inlet relief valve 31 is in communication with the inlet chamber 23 by means of the branched internal passage 27 in order to communicate access fluid flow from the inlet chamber 23 and passage 27 to a common drain reservoir indicated at 46. The relief valve 31 includes a spool or piston 47 slidably arranged within a bore 48 and urged downwardly toward a closed position (see FIG. 1) by the spring 32. The relief valve spool 47 divides the bore 38 into a first chamber 49 arranged at the lower end of the bore 48 and in open communication with the branched conduit 27. A second chamber 51 is formed at the upper end of the bore 48. An annular recess 52 encompasses the bore 48 and communicates with the drain 46 by means of a passage indicated at 53. A lower portion of the relief valve spool 47 adjacent the chamber 49 is formed with a plurality of axially offset ports 54 to modulate fluid flow from the chamber 49 into the drain recess 52 as the spool 47 is urged upwardly against the spring 32.

A fluid signal is communicated into the upper chamber 51 across the by-pass valve 36 and through a passage 56 in a manner described in greater detail below. Since fluid pressure in the upper chamber 51 is proportional to pressure within the inlet chamber 23 and the lower relief valve chamber 49, a poppet relief valve 57 provides selective communication of the upper chamber 51 with the drain recess 52 through a passage 58 in order to relieve excessive pressure, for example, above 2500 psi, from the chamber 51.

To describe the control valve 22 in greater detail, its spool 28 is slidably arranged within a bore 61 formed by the valve body 24. Service chambers 62 and 63 are formed along the bore 61 in spaced apart relation from the inlet chamber 23. The service passage 62 is in communication with the head end of the cylinder 18 by means of a passage 64 formed in the valve body 24 and a conduit 66. The other service chamber 63 is in similar communication with the rod end of the cylinder 18 by means of another passage 67 and a conduit 68.

Drain chambers 71 and 72 are arranged about the bore 61 in respective spaced apart relation from the service chambers 62 and 63.

The spool 28 which is formed with a number of lands and communicating grooves or passages, as described in greater detail below, is shown in a neutral position in FIG. 1 as indicated at "N." The spool 28 is movable toward the left into a position indicated at "R" for directing fluid under pressure from the inlet chamber 2 through the service chamber 63, the passage 67 and the conduit 68 into the rod end of the cylinder 18 in order to raise the bulldozer blade 16. The spool is also movable toward the right into a position indicated at "L" for communicating fluid under pressure from the inlet passage 23 through the service chamber 62, the passage 64 and conduit 66 into the head end of the cylinder 18 for lowering the bulldozer blade 16. The spool 28 also has a float position indicated at "F" where each end of the cylinder 18 and the inlet chamber 23 are placed in communication with one of the drain chambers 71, 72 so that the bulldozer blade 16 is permitted to float along the contour of the ground.

Because of novel features of the control circuit 11, as described in greater detail below, the spool 22 may be urged into its neutral position "N" by a relatively low force, centering spring assembly 73 which tends to facilitate operator control over the valve 22. A detent mechanism 74 cooperates with a cylindrical extension 76 of the spool 28 and an annular ramp 77 formed on the extension rod 76 to permit retention of the spool 28 in its float position once the spool is shifted sufficiently toward the right as viewed in FIG. 1 to permit engagement of the annular ramp 77 by the detent mechanism 74.

Figure 2:
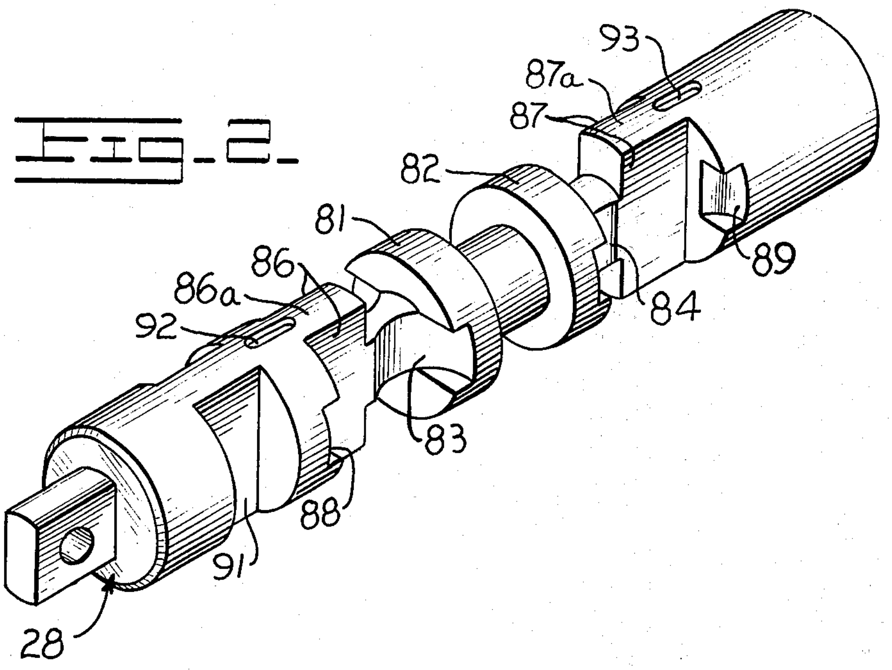
FIG. 2 is an enlarged isometric view of a spool which is slidably arranged within a bore of a control valve in the circuit of FIG. 1.

Referring also to FIG. 2, it may be seen that the spool 28 is formed with a pair of spaced apart lands 81 and 82 which cooperate with the bore 61 when the spool is in its neutral position to block the inlet chamber 23. Pairs of arcuately formed metering slots 83 or 84 are formed adjacent each of the lands 81 and 82 to communicate the inlet chamber with either of the service chambers 62 or 63 as the spool 28 is moved away from its neutral position. A pair of diametrically opposed surface flats or chordal recesses is formed adjacent each of the metering slots 83, 84 to provide communication for the service chamber 62 and 63 with the respective drain chambers 71 and 72. Referring particularly to FIG. 2, the respective pairs of surface flats are indicated respectively at 86 and 87. Arcuate metering slots 88 and 89 are respectively formed adjacent the surface flats 86 and 87 to initially provide metered communication with the drain chambers 71 and 72.

The spool 28 also includes another pair of surface flats 91 formed at the left end of the spool in order to communicate the service chamber 62 with the drain chamber 71 when the spool is shifted into its float position.

Finally, the spool 28 is also formed with a pair of axially elongated signal transmitting slots 92 qnd 93, the size and relative arrangement of the signal transmitting slots upon the spool being of critical importance to the present invention as will be made clear below.

The signal transmitting slots 92 and 93 cooperate with internal passages in the valve body 24 and the by-pass valve 36 for selectively communicating the upper chamber 51 of the relief valve 31 with one of the drain chambers 71 and 72 in the neutral position of the spool 28. A first passage 94 is in communication with the bore 61 through a restrictive orifice 96 arranged between the service chamber 62 and the adjacent drain chamber 71. Another passage 97 is similarly in communication with the bore 61 through a restrictive orifice 98 arranged between the other service chambers 63 and its adjacent drain chamber 72. The passages 94 and 97 are in alternative communication with another passage 99 by means of a ball resolver shuttle-type valve 101.

The by-pass valve 36 inludes a spool 102 arranged within a bore 103 and urged downwardly into its illustrated position by a spring 104. The internal passages 99 and 56 are in communication with the bore 103. Additionally, a lower portion of the relief valve bore 48 is in communication with the bore 103 by means of a restrictive orifice 106 and another passage 107. Finally, the conduit 44 from the pilot control valve 40 is also in communication with the bottom of the by-pass valve bore 103 by means of an internal passage 108.

When the spool 102 of the by-pass valve 36 is normally positioned by its spring 104, the passages 56 and 99 are in communication with each other while the passage 107 is blocked. However, when the manually operated pilot control valve 40 is positioned to initiate movement of the valve 34, fluid pressure is communicated through the conduit 44 and the passage 108 to urge the spool 102 upwardly against its spring so that the passage 56 is placed in communication with the passage 107. With the by-pass valve maintained in this condition, the upper chamber 51 for the relief valve 31 experiences substantially equal pressurization as the lower chamber 49, thus enabling the inlet relief valve 39 to act as a pilot operated relief valve during operation of the second control valve 34. Once the manual pilot control valve 40 is repositioned to terminate operation of the second control valve 34, the fluid signal in the conduit 44 is terminated and the by-pass valve 36 is repositioned to provide normal communication between the internal passages 56 and 99.

Figure 3:
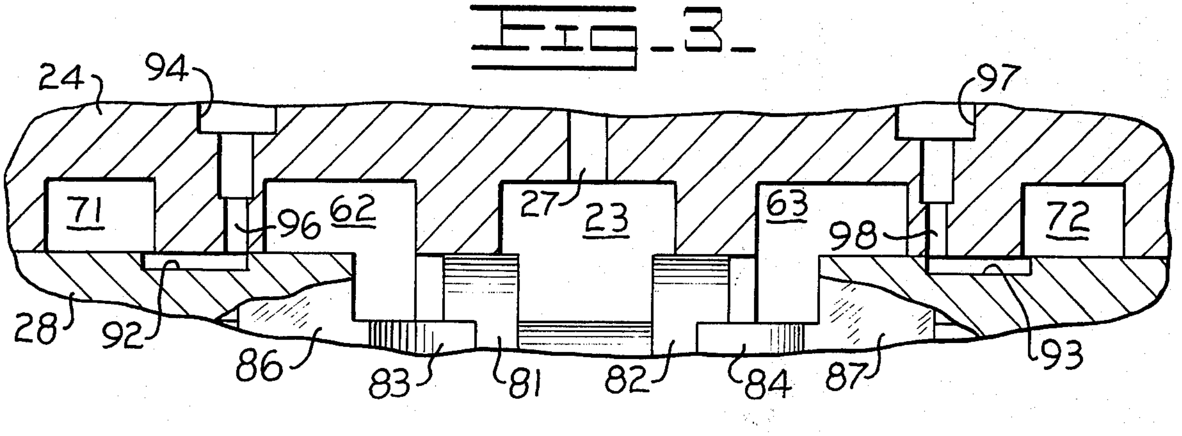
FIGS. 3 and 4 respectively illustrate different operating positions of the control valve spool within its bore.
Figure 4:
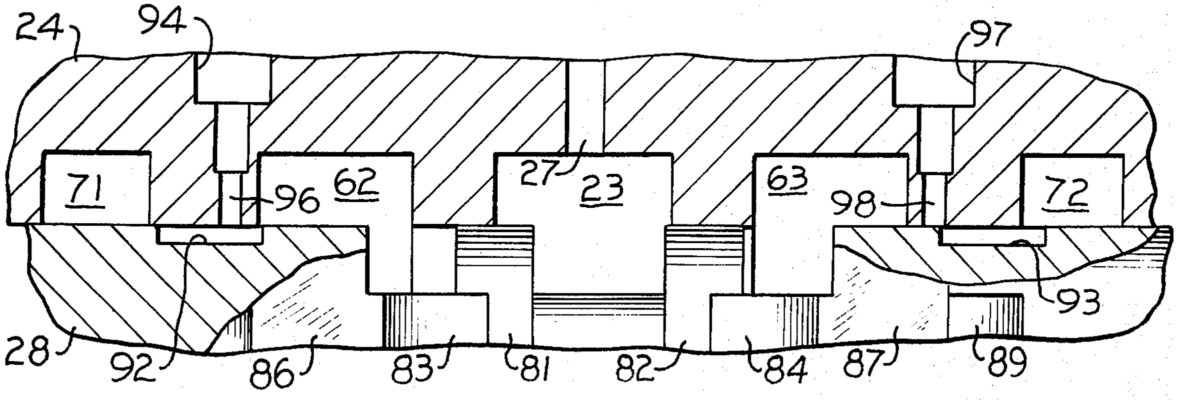

Returning again to the control valve 22, it is again noted that the size and relative location of the signal transmitting slots 92 and 93 upon the spool 28 are of critical importance to the present invention. Initially, it may be seen from FIGS. 1 and 3 that the slots 92 and 93 respectively communicate the passages 94 and 97 with the drain chambers 71 and 72 respectively when the spool is in its neutral position. The length of the slots 92 and 93 is of critical importance to novelty of the present invention and insures that one of the passages 94 and 97 is either in positive commuication with one of the service chambers 62, 63 or the drain chambers 71, 72. As the spool is shifted in either direction from its neutral position, for example, toward the right into an initial position illustrated in FIG. 4, it may be seen that the signal transmitting slot 92 enters into communication with the service chamber 62 before the other signal transmitting slot passes out of register with the restrictive orifice 98. Similarly, as the spool is moved toward the left from its neutral position the signal transmitting slot 93 will enter into communication with the service chamber 63 before the other signal transmitting slot 92 passes out of register with the restrictive orifice 96. This feature of the control valve 22 assures that the upper chamber 51 of the relief valve 31 is always in positive communication with one of the service chambers or a fluid drain. Accordingly, the possibility of a "hydraulic lock" behind the relief spool is prevented thereby maintaining positive control of the inlet pressure.

A second critical feature of the present invention resides in "timing" achieved by the spool for communicating a fluid signal to the upper chamber 51 relative to communication of the inlet chamber 23 with one of the service chambers 62 or 63. Referring again to FIGS. 3 and 4, it may be seen that when the spool is shifted rightwardly into the position illustrated in FIG. 4, the signal transmitting slot 92 communicates the service chamber 62 with the restrictive orifice 96 and the internal passage 94.

However, it is equally important to note that the inlet chamber 23 is not yet in communication with the service chamber 62 across the metering slots 83. Once fluid pressure from the service chamber 62 is communicated into the passage 94, it shifts the ball resolver 101 to the right and communicates fluid pressure from the passage 94 through the passage 99, the by-pass valve 36 and the passage 56 into the upper chamber 51 of the relief valve 31. Accordingly, the relief valve 31 commences to modulate fluid pressure within the inlet chamber 23 before the inlet chamber is placed in communication with the service chamber 62. This "preconditioning" of the inlet pressure tends to prevent any delay in operation of the hydraulic jack 13 once the inlet chamber 23 is placed in communication with either of the service chambers 62 or 63.

Similarly, as the spool 28 is shifted toward the left, the signal transmitting slot 93 places the other service chamber 63 in communication with the upper chamber of the relief valve 31 before the inlet chamber 23 enters into communication with the service chamber 63 across the metering slot 84. Thus, the particular configuration and relative arrangement of the signal transmitting slots 92 and 93 serves to precondition the inlet chamber 23 so that its pressure is modulated to a preselected level prior to its being placed in communication with either of the service chambers.

Thus, the control spool 28 may be shifted in opposite directions for raising or lowering the bulldozer blade 16 while the novel signal transmitting features of the spool 28 in combination with the configuration of the bore 61 and other components of the circuit 11 assure preconditioning of the inlet chamber 23 as well as novelly facilitating manipulation of the control valve spool 28 itself. It may also be noted from the preceeding description that the configuration of the surface flats 86 and 87 provides intermediate full diameter surface portions **86*a* and 87*a* respectively which define one operating limit for the signal transmitting slots 92 and 93. Without this particular configuration, the signal transmitting slots 92 and 93 would always be in communication with the respective service chambers 62 and 63 since they overlap the fluid communicating surface flats 86 and 87 (see FIG. 1**).

Finally, the restrictive orifices 96, 98, and 106 serve to regulate the rate of pressure modulation within the inlet chamber 23. In particular, the orifices 110 and 112 are selectively sized to limit fluid flow to the upper chamber 51 of the relief valve 31 particularly when the spool 28 is moved at a rapid rate away from its neutral position. It may be seen that delayed pressurization of the upper chamber 51 serves to regulate or reduce the rate of pressure modulation with the inlet chamber 23. Similarly, the orifice 106 limits fluid flow from the lower relief valve chamber 49 to the upper chamber 51 and thus serves to regulate or reduce the rate of pressure modulation within the inlet conduit 27 during operation of the second control valve 34.

We claim:

1. In a fluid control circuit for regulating operation of a double-acting hydraulic motor and including a source of fluid under pressure, a control valve having a body defining a bore, an inlet chamber in communication with the bore and the source, service cambers respectively in communication with the control valve bore in axially spaced apart relation on opposite sides of the inlet chamber and drain means in communication with the control valve bore adjacent each service chamber, a spool being reciprocably arranged in the control valve bore and having a neutral position for blocking the inlet chamber from communication with both service chambers, the spool being movable in opposite directions from its neutral position for respectively communicating the inlet chamber with the service chambers and drain means, an inlet relief valve forming a bore having one end in free communication with the inlet chamber and a spool movably arranged in the bore and separating its one end from its other end, the relief valve spool being movable toward the one end of the relief valve bore to block the inlet chamber from a drain opening and toward the other end of the relief valve bore to communicate the inlet chamber with the drain opening, spring means urging the relief valve spool toward the one end of the relief valve bore, means forming signal passages communicating the other end of the relief valve bore with the control valve bore intermediate each service chamber and adjacent drain means, the improvement comprising a pair of axially elongated signal transmitting slots formed by the control valve spool for selectively and respectively communicating each signal passage with one of the service chambers and the adjacent drain means, the spool also forming means for selectively communicating the inlet chamber with the service chambers, each signal transmitting slot having a selected axial length and relative arrangement on the spool to communicate its respective signal passage with the drain means when the spool is in its neutral position and to positively communicate its signal passage with the respective service chamber substantially prior to communication of the inlet chamber with the respective service chamber in order to precondition the inlet relief valve for commencing modulation of fluid pressure in the inlet chamber prior to communication of the inlet chamber with the respective service chamber.

2. The control circuit of claim 1 wherein the control valve spool is movable in opposite directions from its neutral position to provide substantially free communication between the inlet chamber and the respective service chambers, metering means being movable with the control valve spool to provide a variable opening between the inlet chamber and the respective service chambers as the spool is moved from its neutral position toward its respective positions providing substantially free communication with the respective service chambers, the spring means being selected to establish a differential pressure between the inlet chamber and each of the respective service chambers when they are communicated by the metering means and to establish the only substantial force tending to urge the relief valve spool toward the one end of the relief valve bore when the control valve spool is in its neutral position.

3. The control circuit of claim 2 wherein the control valve spool is formed with axially spaced lands for regulating fluid flow through the control valve bore, the metering means being axially extending slots formed in the control valve spool, and further comprising a restriction means in the passages communicating fluid from the service chambers to the other end of the inlet relief valve bore to dampen the rate of fluid flow into the inlet relief valve bore, and an overpressure relief valve in communication with the other end of the inlet relief valve bore.

4. The control circuit of claim 1 wherein the axial length and relative arrangement of each signal transmitting slot is further selected to positively communicate its signal passage with the respective service chamber before the other signal transmitting slot terminates communication between its signal passage and the respective drain means.

5. The control circuit of claim 4 further including a hydraulic motor having an inlet passage in communication with the inlet chamber of the control valve, a bypass valve in responsive communication with said hydraulic motor having said inlet passage and normally providing communication for the passages from the service chambers with the other end of the inlet relief valve bore, the bypass valve functioning in operative response to actuation of the additional motor for directly communicating the other end of the inlet relief valve bore with its one end, the inlet relief valve then functioning as a pilot operated relief valve during actuation of the additional motor.

6. A fluid control circuit for regulating fluid communication between a source of fluid under pressure and a hydraulic motor, comprising a control valve having an inlet chamber in communication with the source, a service chamber in communication with the motor and a spool for selectively communicating the inlet chamber with the service chamber, an inlet relief valve having first and second chambers with a relief spool movably mounted therebetween, the relief spool being movable toward the second chamber to communicate the first chamber with a drain and spring means urging the relief spool toward the first chamber, the first chamber of the inlet relief valve being in communication with the inlet chamber of the control valve, a signal passage formed by the control valve in communication with the second chamber of the inlet relief valve, and signal transmitting means responsive to movement of the control valve spool in its bore and in communication with the signal passage to communicate the second chamber of the inlet relief valve with the service chamber substantially prior to communication of the inlet chamber with the service chamber in order to precondition the inlet relief valve for commencing modulation of fluid pressure in the inlet chamber prior to communication of the inlet chamber with the service chamber.

7. The fluid control circuit of claim 6 wherin the signal transmitting means if further responsive to movement of the control valve spool in its bore to positively communicate the signal passage either with fluid pressure from the service chamber or with a fluid drain at all times.

8. The fluid control circuit of claim 7 further including a hydraulic motor having an inlet passage in communication with the inlet chamber of the control valve, a bypass valve in responsive communication with the additional motor and normally providing communication for the signal passage with the second chamber of the inlet relief valve, the bypass valve functioning in operative response to actuation of the additional motor for directly communicating the first and second chambers of the inlet relief valve and causing the inlet relief valve to function as a pilot operated relief valve during actuation of said hydraulic motor having said inlet passage.

9. The fluid control of claim 6 further including a hydraulic motor having an inlet passage in communication with the inlet chamber of the control value, a bypass valve in responsive communication with said hydraulic motor having said inlet passage and normally providing communication for the signal passage with the second chamber of the inlet relief valve, the bypass valve functioning in operative response to actuation of the additional motor for directly communicating the first and second chambers of the inlet relief valve and causing the inlet relief valve to function as a pilot operated relief valve during actuation of the additional motor.

10. A fluid control circuit for regulating operation of a double-acting hydraulic motor and comprising a source of fluid under pressure, a control valve body defining a bore, an inlet chamber in communication with the bore and the source, service chambers respectively in communication with the control valve bore in axially spaced apart relation on opposite sides of the inlet chamber and drain means also in communication with the control valve bore in axially spaced apart relation from each service chamber, a spool reciprocably arranged in the control valve bore and having a neutral position wherein the spool blocks the inlet chamber from communication with both service chambers, the spool being movable in opposite directions from its neutral position for respectively communicating the service chambers with the inlet chamber and drain means, metering means movable with the control valve spool to provide a variable opening between the inlet chamber and the respective service chambers as the spool is moved from its neutral position toward its respective positons providing substantially free communication with the respective service chambers, an inlet relief valve forming a bore having one end in free communication with the inlet chamber, a relief spool being movably arranged in the inlet relief bore for separating its one end from its other end, the inlet relief valve bore having an opening in communication with drain, the relief spool being movable toward the one end of the relief valve bore to block the inlet chamber from the drain opening and toward the other end of the relief valve bore to communicate the inlet chamber with the drain opening, spring means urging the relief spool toward the one end of the relief valve bore, the spring means being selected to establish a differential pressure between the inlet chamber and each of the respective service chambers when they are placed in communication by the metering means and to establish the only substantial force tending to urge the relief spool toward the one end of the relief valve bore and limit communication between the inlet chamber and drain opening when the control valve spool is in its neutral position, means forming signal passages in the control valve body comprising a branched passage communicating the other end of the relief valve bore with the control valve bore at a location intermediate each service chamber and the adjacent, axially spaced apart drain means, and regulating means being movable with the control valve spool and in regulating communication with the signal passages to communicate the other end of the relief valve bore with the respective service chambers before they are placed in communication with the inlet chamber by the control valve spool and to communicate the other end of the relief valve bore with the drain means when the control valve spool is in its neutral position, the regulating means comprising axially elongated slots formed in the control valve spool for selectively communicating the branched signal passages with the respective service chambers and drain means, each slot being configured to positively communicate the signal passages with a service chamber before the other slot terminates communication between the signal passages and the drain means.

11. The fluid control circuit of claim 10 further comprising a shuttle valve arranged in a juncture of the branched signal passages.

12. A fluid control circuit for regulating operation of a double-acting hydraulic motor and comprising a source of fluid under pressure a control valve body defining a bore, an inlet chamber in communication with the bore and the source, service chambers respectively in communication with the control valve bore in axially spaced apart relation on opposite sides of the inlet chamber and drain means also in communication with the control valve bore in axially spaced apart relation from each service chamber, a spool reciprocably arranged in the control valve bore and having a neutral position wherein the spool blocks the inlet chamber from communication with both service chambers, the spool being movable in opposite directions from its neutral position for respectively communicating the service chambers with the inlet chamber and drain means, metering means movable with the control valve spool to provide a variable opening between the inlet chamber and the respective service chambers as the spool is moved from its neutral position toward its respective positions providing substantially free communication with the respective service chambers, an inlet relief valve forming a bore having one end in free communication with the inlet chamber, a relief spool being movably arranged in the inlet relief valve bore for separating its one end from its other end, the relief valve bore having an opening in communication with drain, the relief spool being movable toward the one end of the relief valve bore to block the inlet chamber from the drain opening and toward the other end of the relief valve bore to communicate the inlet chamber with the drain opening, spring means urging the relief spool toward the one end of the relief valve bore, the spring means being selected to establish a differential pressure between the inlet chamber and each of the respective service chambers when they are placed in communication by the metering means and to establish the only substantial force tending to urge the relief spool toward the one end of the relief valve bore and limit communication between the inlet chamber and drain opening when the control valve spool is in its neutral position, means forming signal passages in the control valve body comprising a branched passage communicating the other end of the relief valve bore with the control valve bore at a location intermediate each service chamber and the adjacent, axially spaced apart drain means, and regulating means being movable with the control valve spool and in regulating communication with the signal passages to communicate the other end of the relief valve bore with the respective service chambers before they are placed in communication with the inlet chamber by the control valve spool and to communicate the other end of the relief valve bore with the drain means when the control valve spool is in its neutral position, the regulating means comprising axially elongated slots formed in the control valve spool for selectively communicating the branched signal passages with the respective service chambers and drain means, each slot being configured to positively communicate the respective service chamber with the signal passages substantially prior to communication of the inlet chamber with the respective service chamber in order to precondition the inlet relief valve for commencing modulation of fluid pressure in the inlet chamber prior to communication of the inlet chamber with the respective service chamber.

13. The fluid control circuit of claim 12 further comprising a shuttle valve arranged in a juncture of the branched signal passages.

* * * * *

UNITED STATES PATENT AND TRADEMARK OFFICE
CERTIFICATE OF CORRECTION

PATENT NO. : 3,995,532

DATED : December 7, 1976

INVENTOR(S) : John A. Junck, et al

It is certified that error appears in the above-identified patent and that said Letters Patent are hereby corrected as shown below:

Column 4, line 27, "access" should be --excess--

Column 5, line 54, "qnd" should be --and--

Column 6, line 28, "39" should be --31--

Column 6, line 45, "commuication" should be --communication--

Column 8, line 3, "cambers" should be --chambers--

Column 9, line 59, "wherin" should be --wherein--

Column 10, line 50, --valve-- should appear after "relief"

Signed and Sealed this

*Twenty-third* Day of *May 1978*

[SEAL]

*Attest:*

RUTH C. MASON
*Attesting Officer*

LUTRELLE F. PARKER
*Acting Commissioner of Patents and Trademarks*